United States Patent [19]

Benito

[11] 4,434,574
[45] Mar. 6, 1984

[54] BIRD ENVIRONMENTAL INSPECTION TRAP

[76] Inventor: Calvin G. Benito, Rte. 2, Box 168, Pauls Valley, Okla. 73075

[21] Appl. No.: 393,200

[22] Filed: Jun. 28, 1982

[51] Int. Cl.³ .......................................... A01M 23/02
[52] U.S. Cl. ................................................. 43/63
[58] Field of Search ............................ 43/63, 60, 88

[56] References Cited

U.S. PATENT DOCUMENTS

| | | | |
|---|---|---|---|
| 521,266 | 6/1884 | Irwin | 43/63 |
| 966,213 | 8/1910 | Jauregin | 43/63 |
| 1,553,536 | 9/1925 | Irvine | 43/63 |
| 1,850,182 | 3/1932 | Schulhe | 43/63 |
| 1,886,114 | 11/1932 | McMullen | 43/63 |
| 3,596,395 | 8/1981 | Clement | 43/63 |

Primary Examiner—Gene P. Crosby
Attorney, Agent, or Firm—Robert K. Rhea

[57] ABSTRACT

In a wild bird trap, a pair of control housings are recessed in the surface of the earth or disposed below the surface of a body of water which respectively support a pair of horizontal net arms when the trap is in unsprung position. A section of netting extends between and is connected with the pairs of arms. Housing contained pressure cylinders, connected with the respective net arms, are connected with a source of fluid under pressure through a solenoid valve opened in response to closing a circuit in a remote concealed location for actuating the cylinders and springing the trap.

5 Claims, 5 Drawing Figures

BIRD ENVIRONMENTAL INSPECTION TRAP

BACKGROUND OF THE INVENTION

1. Field of the Invention

The present invention relates to a trap for water fowl or birds and more particularly to a remotely controlled net trap.

For environmental control, game rangers trap and band small game, as well as birds or water fowl.

2. Description of the Prior Art

The prior art patents generally disclose animal traps for trapping small animals which generally comprise opposing frames pivoted toward each other by one or more spring members tripped by the animal releasing a trigger for trapping a single animal.

The most pertinent prior patent is believed U.S. Pat. No. 3,596,395 which discloses a pair of bow members hingedly connected together and spanned by net fabric in which one bow member is biased by springs from a horizontal cocked position overlying the other bow member on the surface of the earth to an opposite position enveloping and holding the trapped animal or bird on the surface of the earth in response to a remotely controlled radio signal.

The present invention is distinctive over this and other prior patents by hingedly connecting two pairs of arms to spaced-apart control units buried in the surface of the earth or disposed below the level of a body of water in which netting is secured to and extends between the respective pairs of arms. Pressure cylinders, connected with the respective arm of the pairs of arms, lift the arms and opposing side portions of the netting from a horizontal position to an upright position for enveloping a plurality of birds or water fowl in response to a remotely controlled operating valve connecting the pressure cylinders with a source of fluid under pressure contained by the respective control unit.

SUMMARY OF THE INVENTION

A pair of hollow generally rectangular housings forming trap control units are disposed in longitudinally aligned spaced-apart relation and recessed into the surface of the earth or supported in a body of water adjacent the surface thereof. A pair of longitudinally aligned arms are hingedly connected at their adjacent ends to a framework supported by the respective housing for vertical pivoting movement of the arms toward and away from each other. A rectangular section of fabric, preferably loose net material, extends between and is connected at its respective ends with the respective pair of arms. The area encompassed by the netting is baited for attracting birds to be trapped and when used on land the entire trap is camouflaged. Each housing contains a cylinder of fluid under pressure operatively connected with a pair of pressure cylinders supported by the housing framework and connected with the respective pair of arms. The trap is sprung by opening a solenoid valve, interposed in the respective fluid pressure supply line from a remote electric control position.

The principal object of this invention is to provide an environmental control water fowl and bird trap for simultaneously trapping a plurality of fowl, small game or fish for banding, inspection or taking fish which will not harm the fowl, game or fish.

BRIEF DESCRIPTION OF THE DRAWINGS

Like characters of reference designate like parts in those figures of the drawings in which they occur.

In the drawings.

Figure 1:
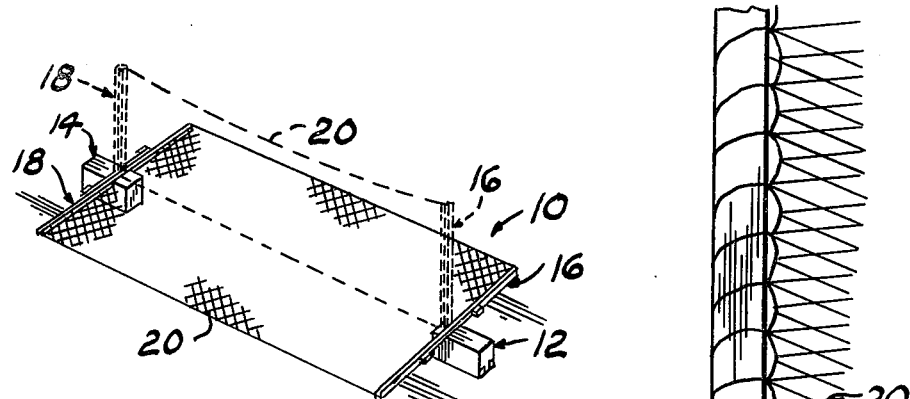
FIG. 1 is a perspective view of the trap illustrating, by dotted lines, its sprung position.
Figure 5:
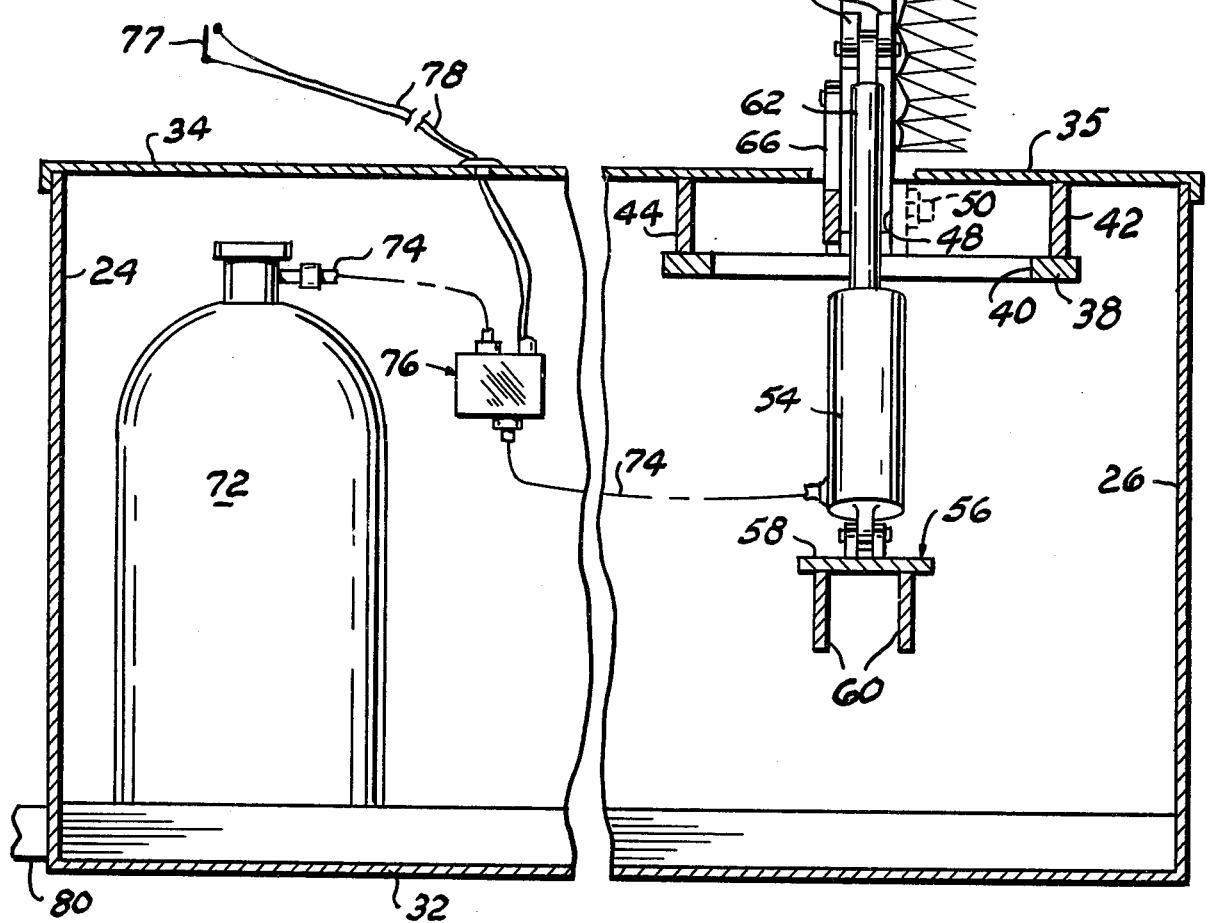

The reference numeral 10 indicates the trap, as a whole, which is elongated rectangular in general configuration when in its unsprung position. The trap 10 comprises a pair of rectangular housings 12 and 14 disposed in selected spaced-apart relation which respectively support a pair of tubular net arms 16 and 18 extending transversely of the respective housing from a horizontal aligned position of the respective pair of arms when unsprung to a vertical juxtaposed position of the respective pair of arms when in trap sprung position.

A rectangular sheet of fabric, preferably netting 20, extends between and is connected at its respective ends in any suitable manner with the pairs of arms 16 and 18. Since the control housings 12 and 14 and pairs of arms 16 and 18 are substantially identical, being mirror images of each other, only the housing 12 and pair of arms 16 will be described in detail in the interest of brevity. The housing 12 may be of any desired configuration but is rectangular in the example shown with its longitudinal axis aligned with the longitudinal axis of the companion housing 14 for the purpose believed readily apparent.

Figure 2:
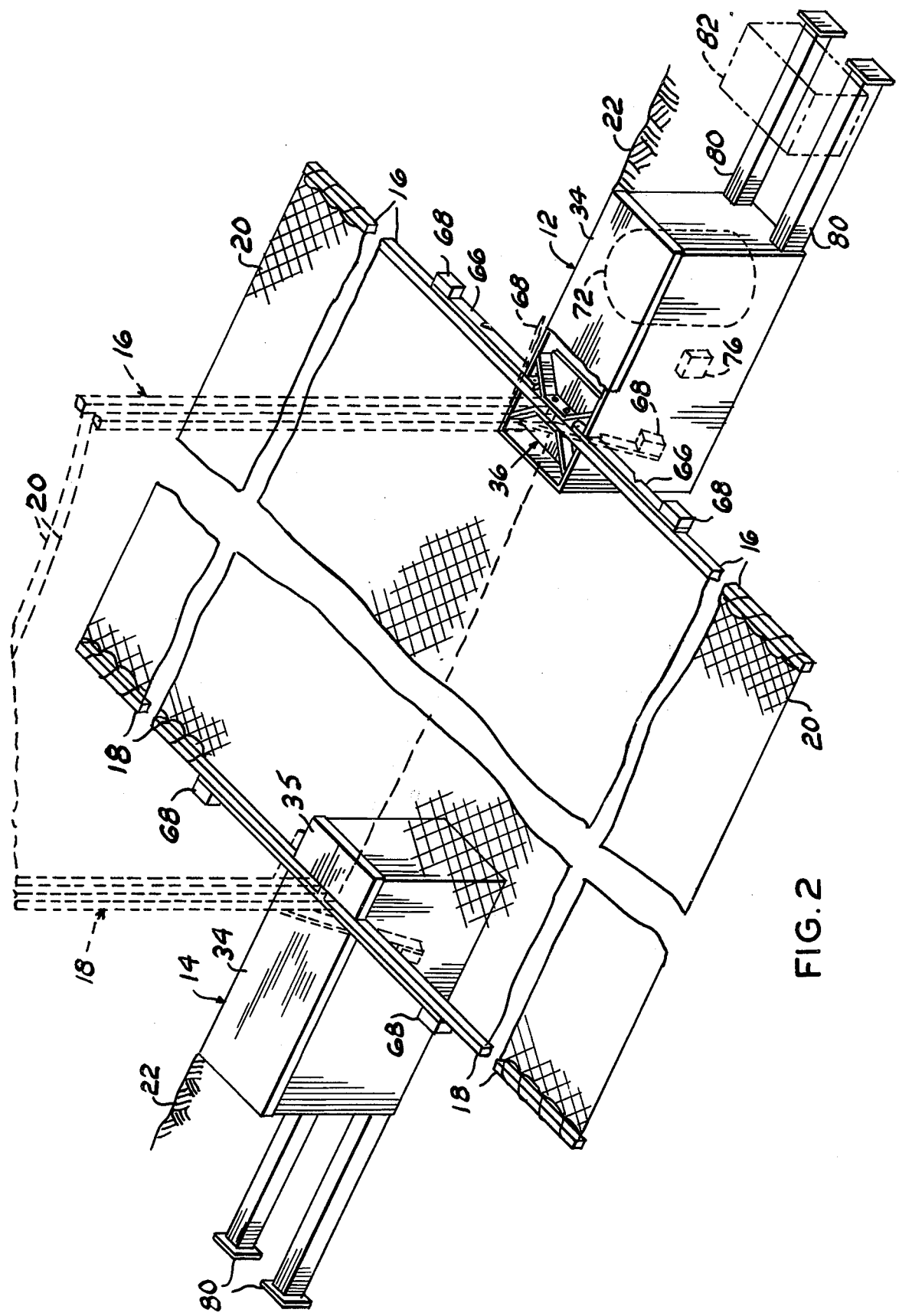
FIG. 2 is a fragmentary isometric view of the trap to a larger scale.

The housing 12 is preferably buried in the surface of the earth, as indicated at 22 (FIG. 2), so that its upper limit is near the surface of the earth for the purposes of camouflaging or concealing the housing and pair of arms 16 from view, as by placing cuttings of vegetation thereover. When the trap is to be used for trapping water fowl, the housing is disposed in a shallow portion of a body of water wherein the upper surface of the housing is preferably spaced a few inches below the surface of the water.

The housing 12 is defined by a rear end wall 24, a forward end wall 26 and side walls 28 and 30 all secured to a bottom wall 32, with the housing being covered by a two part lid 34 and 35 thus forming a generally hollow housing. A net arm frame means 36 is mounted in the forward end portion of the housing adjacent its upper limit. The frame means 36 comprises a horizontal plate 38 extending transversely between the side walls 28 and 30 and secured thereto. Opposing side portions of the plate are cut away in a generally V-shape 40 extending inwardly from the respective side wall 28 and 30 for the reason presently explained.

Figure 4:
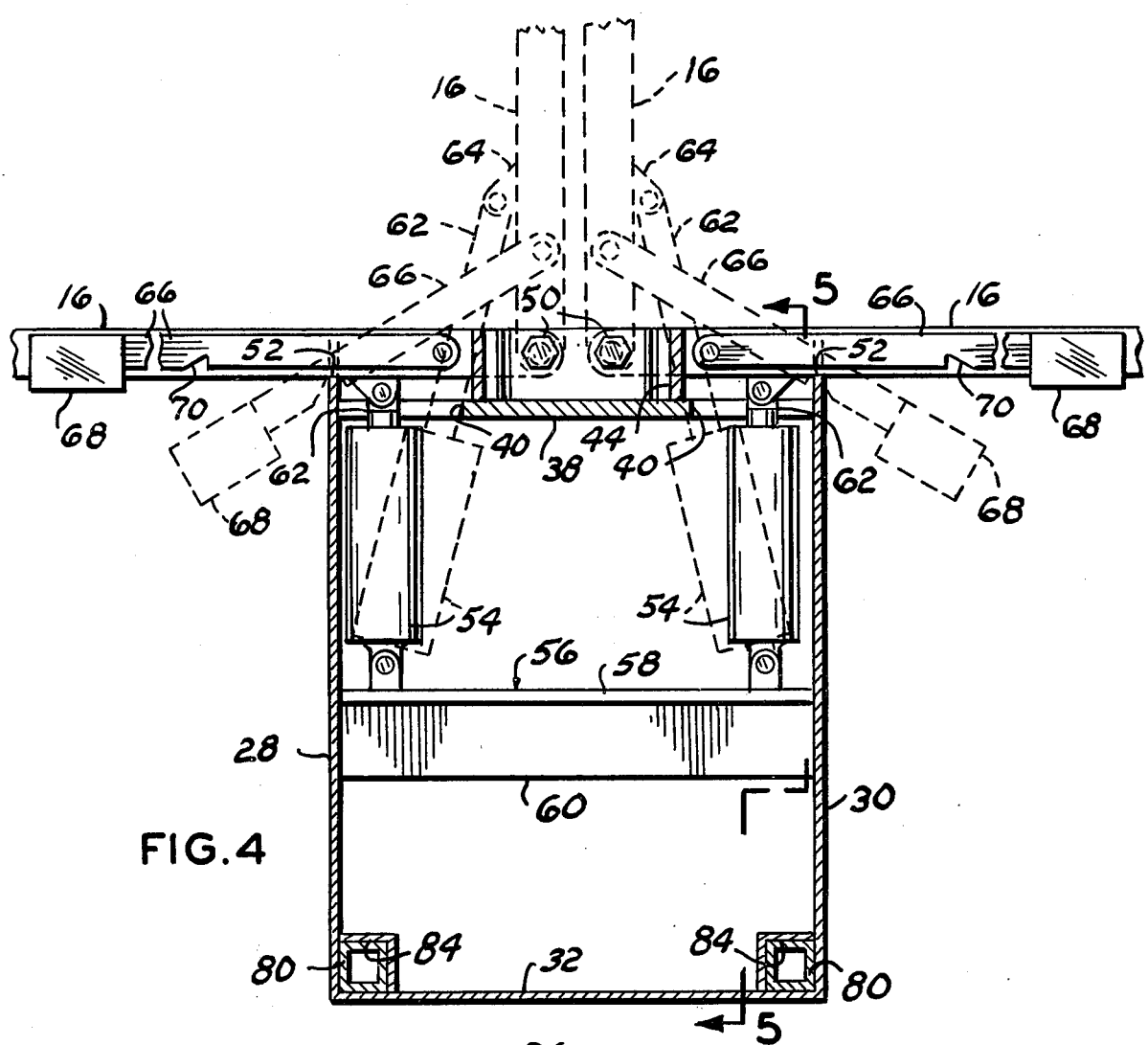
FIG. 4 is a fragmentary vertical cross sectional view, partially in elevation, taken substantially along the line 4—4 of FIG. 3 illustrating, by dotted lines, the net arms in sprung position; and, FIG. 5 is a fragmentary vertical cross sectional view, partially in elevation, taken substantially along the line 5—5 of FIG. 4 with the net arms in sprung position.
Figure 3:
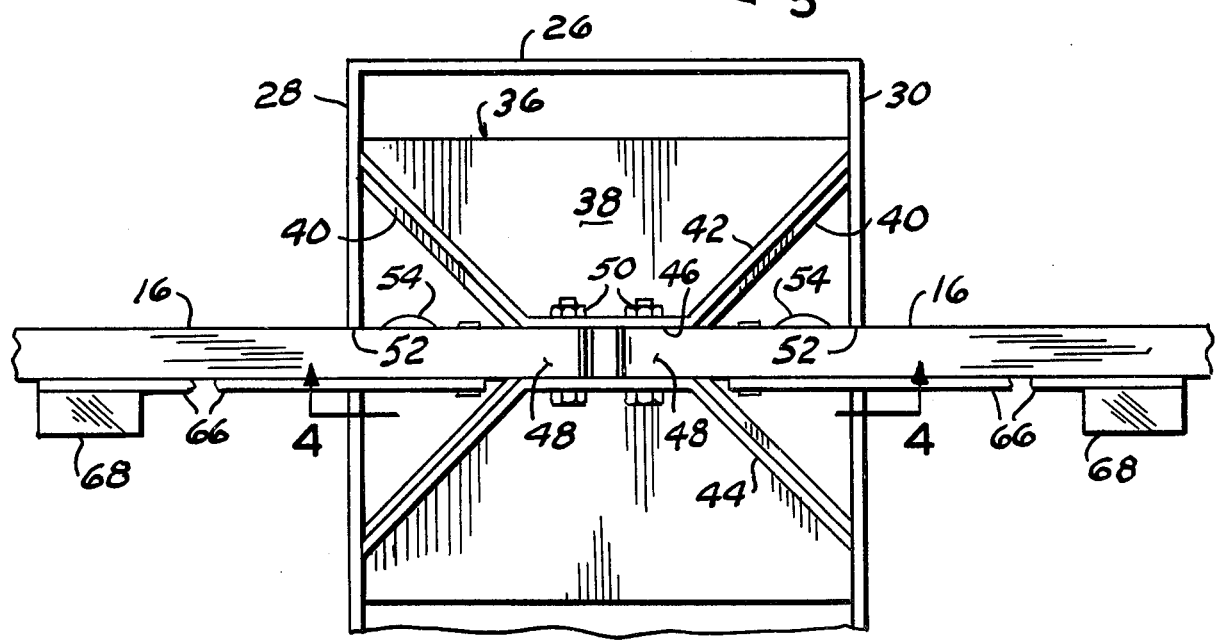
FIG. 3 is a fragmentary top view of the net arm supporting end portion of one housing of the trap.

The frame means 36 further includes a pair of generally X-shaped, in top view (FIG. 3), strap iron members 42 and 44 vertically disposed edgewise on the plate 38 and defining, at their juncture or medial portions, a horizontal upwardly open slot 46 extending transversely of the housing and medially of its width for receiving the inner end portions 48 of the pair of arms 16 which are secured to the members 42 and 44 by bolts 50 permitting vertical pivoting movement of the outwardly disposed end portions of the net arms 16 from a horizontal unsprung position to their vertical trap sprung position, as illustrated by dotted lines (FIGS. 1 and 4). The upper edge portion of the respective side wall 28 and 30 is provided with an upwardly open slot 52 for nesting the respective net arm when in unsprung position. When the trap is used on dry land, the net arms 16 are similarly recessed in the surface of the earth.

A pair of pressure cylinders 54 are mounted in upstanding relation adjacent the inner surface of the respective side wall 28 and 30 on a horizontal bridge means 56 extending transversely between the side walls in parallel downwardly spaced relation with respect to the net arms when in unsprung position. The bridge means 56 comprises a top member 58 and a pair of depending reinforcing ribs 60.

The piston rod 62 of the respective pressure cylinder projects upwardly through the respective plate opening 40 and is pivotally connected with the adjacent end portion of the respective arm 16 by ears 64 secured thereto for pivoting the pair of arms 16 upwardly to a vertical trap sprung position. A pair of lock links 66 are respectively pivotally connected flatly at one end portion with the net arms 16 adjacent their pivotal connection with the frame means 36. The other end portion of the lock links 66 projects outwardly beyond the vertical plane of the respective side wall 28 and 30 parallel with the arms 16 and are each provided with a counterweight 68 for biasing the outwardly disposed end portion of the respective lock link downwardly by gravity when the net arms are pivoted to an upright position. Intermediate their ends, the depending edge of each lock link is provided with a downwardly open notch 70 positioned for engaging the upper edge surface of the respective side wall 28 and 30 forming the lower limit of the housing slot 52 for maintaining the pair of net arms 16 in vertical trap sprung position.

A cylinder 72, containing fluid under pressure, is disposed within each housing and is connected by tubing 74 with the respective pressure cylinder 54 through a solenoid valve means 76. The solenoid valve means 76 is connected with a source of electrical energy, not shown, through a suitable control, such as a switch 77, by wires 78 for opening the valve of each each valve means and applying pressure to and actuating the pressure cylinders 54 from a position remote from the trap 10.

The housing further includes a pair of tubular outriggers 80 movable longitudinally outward from the rearward end wall 24 of the housing for the purpose of receiving in overlying relation a counterweight, such as a block of concrete 82, or the like, to compensate for the mass of the net 20 and birds or game when the trap is in sprung position. The outriggers 80 are substantially coextensive with the length of the housing and are normally nested therein within cooperating sockets 84 formed in the housing adjacent its bottom wall 32 and respective side walls 28 and 30.

Operation

If the trap 10 is to be used on the surface of the earth, the housings 12 and 14 are placed within excavations formed in the earth so that the upper limit of the respective housing is adjacent the surface of the earth, the outriggers 80 being extended and the earth back filled over them with or without the counterweight 82. Similarly, a cooperating ditch is formed in the surface of the earth laterally of the respective housing for nesting the pairs of net arms 16 and 18 and permitting downward pivoting movement of the lock arms 66. With the net arms horizontally disposed in their unsprung position, the net 20 is secured thereto, if not previously attached. The electrical control wire 78, is extended to a concealed position remote from the trap affording full view of the trap position for operator control of the trap. The entire trap, including housings, net arms and net, are camouflaged, as by grass, leaves, hay, or the like, and the area encompassed by the net, is baited with bait to attract the particular bird to be trapped.

If the trap is to be used for trapping water fowl, the trap is disposed in a body of water, as mentioned hereinabove and the net area baited. When a plurality of birds are feeding in the area encompassed by the net 20, the operator energizes the solenoid valve means 76 to spring the trap and elevate the pairs of net arms 16 and 18 in unison so that birds over the net 20 are enclosed by respective side portions of the net 20 extending between the vertically disposed pairs of net arms 16 and 18. Thereafter, the operator manually removes the birds, one at the time, for banding or treating before releasing. It seems obvious that the trap 10 may be used for trapping fish, if desired.

Obviously the invention is susceptible to changes or alterations without defeating its practicability. Therefore, I do not wish to be confined to the preferred embodiment shown in the drawings and described herein.

I claim:

1. A wild bird trap, comprising:
a pair of spaced-apart housings;
frame means within each housing;
a pair of net arms extending transversely of the respective housing in longitudinally aligned relation and pivotally connected at one end portion with said frame means for vertical pivoting movement of the other end portion of said pairs of net arms in unison from a horizontal unsprung position to an upright position;
netting extending between said housings and connected with each pair of arms;
pressure cylinder means within each housing and operatively connected with each net arm of said pairs of net arms for pivoting each pair of net arms to a sprung position; and,
remotely operated control means for actuating said pressure cylinder means.

2. The trap according to claim 1 in which said frame means includes:
a horizontally disposed plate secured within each said housing; and,
opposing strap iron members overlying said plate and defining an upwardly open slot for nesting adjacent end portions of the respective pair of net arms.

3. The trap according to claim 2 in which said pressure cylinder means includes:
a pair of pressure cylinders each having a piston rod connected with each net arm of said pair of net arms adjacent their connection with said frame means;
a source of fluid pressure; and,
tubing connecting the source of fluid pressure with said pressure cylinders.

4. The trap according to claim 1 or 3 and further including;

a pair of lock links pivotally connected with the respective pair of net arms adjacent their pivotally connected end portions for maintaining said net arms in sprung position.

5. The trap according to claim 1 and further including:
   outrigger means projecting outwardly of each said housing opposite the netting for counterbalancing the mass of the netting when said trap is in sprung position.

* * * * *